US008380706B2

(12) United States Patent
Patel (10) Patent No.: US 8,380,706 B2
(45) Date of Patent: Feb. 19, 2013

(54) SPONSORED SEARCH COVERAGE EXPANSION

(75) Inventor: Kavel Patel, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 973 days.

(21) Appl. No.: 11/567,099

(22) Filed: Dec. 5, 2006

(65) Prior Publication Data

US 2008/0133477 A1    Jun. 5, 2008

(51) Int. Cl.
*G06F 7/00* (2006.01)
*G06F 17/30* (2006.01)

(52) U.S. Cl. ......................................................... 707/722

(58) Field of Classification Search .................. 707/722, 707/999.003
See application file for complete search history.

(56) References Cited

U.S. PATENT DOCUMENTS

| 6,269,361 | B1 * | 7/2001 | Davis et al. | 707/3 |
| 7,346,615 | B2 * | 3/2008 | Bem | 707/5 |
| 7,349,876 | B1 * | 3/2008 | Veach | 705/35 |
| 2004/0267612 | A1 * | 12/2004 | Veach | 705/14 |
| 2005/0283464 | A1 * | 12/2005 | Allsup et al. | 707/3 |
| 2006/0106710 | A1 * | 5/2006 | Meek et al. | 705/37 |
| 2006/0149625 | A1 * | 7/2006 | Koningstein | 705/14 |
| 2007/0067267 | A1 * | 3/2007 | Ives | 707/3 |
| 2008/0010270 | A1 * | 1/2008 | Gross | 707/5 |

OTHER PUBLICATIONS

Google AdSense "What's AdSense?", www.google.com/services/adsense_tour/index.html., copyright 2004.

* cited by examiner

*Primary Examiner* — Kimberly Wilson
(74) *Attorney, Agent, or Firm* — Weaver Austin Villeneuve & Sampson LLP (57) ABSTRACT

An embodiment is provided wherein a search query is received from a user. It may then be determined if the search query would ordinarily result in a results page having no sponsored search advertising. If the search would ordinarily result in a results page having no sponsored search advertising, then advertising that would ordinarily be displayed in response to each of two or more search terms making up the search query individually may be aggregated. Then one or more advertisements may be selected from the aggregated advertising. Then the selected advertisements may be displayed on a results page responsive to the search query.

24 Claims, 7 Drawing Sheets

SPONSORED SEARCH COVERAGE EXPANSION

BACKGROUND OF THE INVENTION

1. Field of the Invention

The present invention relates to the field of Internet searching. More specifically, the present invention relates to sponsored search coverage and expansion.

2. Description of the Related Art

Figure 1:
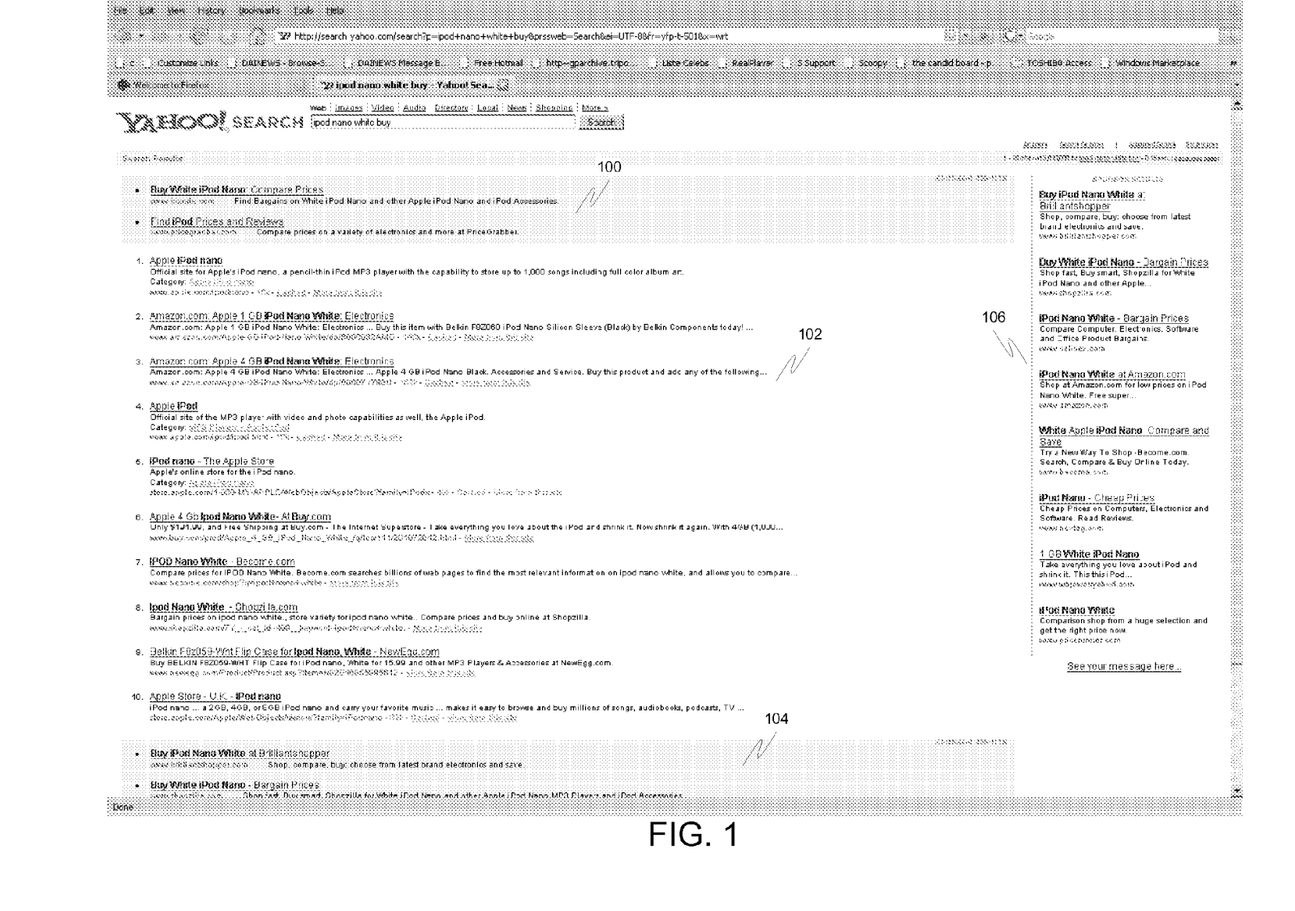
FIG. 1 is a screen capture illustrating an example search in a search engine or directory.

When searching for results in an Internet search engine or directory, it is common for advertisements to be displayed on the web page displaying the results of the search. FIG. 1 is a screen capture illustrating a search for the terms "iPod," "nano", "white," and "buy." As can be seen, ads 100 may be displayed above the search results 102. The ads 100 displayed above search results are often called "North" ads. Ads 104 may also be displayed below the search results 102. These ads 104 are often called "South" ads. "East" ads 106 may be displayed to the right of the search results 102. Search results 102 are sometimes called "natural" results.

The advertisements may take the form of sponsored search results, wherein sponsors pay to have particular search term combinations return a results page in which the sponsor's links are also displayed (along with, perhaps, a short description of the link). Sponsors often pay for such advertising on a per-click basis, wherein the total advertising charge is based on the number of times users click on the sponsored link.

Currently, however, an average of 35% of all search results pages have no sponsored search ads at all (i.e., have no "coverage"). This may be due to a variety of factors, such as that the search term combination is very narrow, very long, or that advertisers simply are not aware of the search term combination(s). What is needed is a solution that aids in monetizing search results pages that have no coverage.

SUMMARY OF THE INVENTION

An embodiment is provided wherein a search query is received from a user. It may then be determined if the search query would ordinarily result in a results page having no sponsored search advertising. If the search would ordinarily result in a results page having no sponsored search advertising, then advertising that would ordinarily be displayed in response to each of two or more search terms making up the search query individually may be aggregated. Then one or more advertisements may be selected from the aggregated advertising. Then the selected advertisements may be displayed on a results page responsive to the search query.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

During the inventive process surrounding the present invention, a significant amount of research was conducted to measure the usage patterns of users performing searchers, and specifically patterns involving the search queries that resulted in pages with no coverage. Through this research, users could be classified based on the amount of searches they performed (i.e., pages consumed). The classifications could be heavy, moderate, and light users, with light users consuming the least amount of pages. In this research, it was unexpectedly discovered that light users have the best likelihood of clicking on advertising on the search results page. It was also unexpectedly discovered that a significant proportion of light user activity has no coverage. In other words, it was unexpectedly discovered that a significantly large volume of search queries that resulted in pages with no coverage were potentially the most valuable type of search query. This realization resulted in approaching the problem from a completely new perspective—i.e., from the user perspective.

Additionally, through the research described above, it was unexpectedly discovered that a large number of the queries resulting in pages with no coverage were queries made up of multiple search terms, wherein each term itself would have resulted in pages with coverage. For example, the user might search the terms "ipod," "nano," "white," "Sunnyvale," "buy." When searching all those terms at once results in a page with no coverage, the individual search terms themselves would have resulted in pages with coverage (for example, if "ipod" alone was searched). In an embodiment of the present invention, if a query would result in a page with no coverage, an advanced matching process may be applied to match ads that pertain to components of the multiple term query. Thus, in the example above, an advanced matching process could be used to draw advertisements placed on the term "ipod" and "nano" and place them on the result pages of the combined query. The cost of the ads may be discounted to account for the fact that the advertisers did not specifically request the particular term combination. In one embodiment of the present invention, these ads are displayed for free (i.e., the advertiser pays nothing when the user clicks on it). The hope with the free ad is that over time the advertiser will recognize that a good number of visitors came to their website via the ad and that these visitors were more likely to purchase goods or services, thus ultimately allowing the search engine to start charging for ads on this query.

In the embodiment where a discount is applied to the per-click charge, the discount may be tied to the relevancy of the search combination to the originally purchased query for advertisement. The closer the search query is to the one the advertiser purchased, the higher the cost. For example, if the advertiser purchased an ad on the results page of "ipod nano," then a discounted advertisement may be placed on the results page of "ipod nano white" and an even further discounted advertisement may be placed on the results page of "ipod nano white Sunnyvale buy." The advanced matching process may also take into account the geographic location of the advertiser (for advertisers where geographic location matters) and use that information in determining whether to display an advertisement on a particular search term combination and/or how much to charge for such an advertisement. The advanced matching process may also apply weighting to certain terms, such that common variations of a particular search query, for example adding a color (e.g., white) to the search term may receive a higher weighting than uncommon variations of a particular search query, for example, adding a tangential term (e.g., astronomy). The advanced matching process may also base its decision on the popularity of certain terms, the price per click for certain terms, the historic click-through rate for the query, the grammatical context of the query (e.g., proper nouns are more likely to result in click-through), and other factors. It should be noted that this advanced matching process may be applied to the selection of which advertisements to display in addition to the determination of costs to be charged.

In another embodiment of the present invention, queries that would result in pages with no coverage are classified into categories. These categories may be based on the categorization scheme of the underlying search engine or directory. Then, for any queries in a particular category that would result in pages with no coverage, the advertisements that have historically the best click-though rates in that category may be displayed. This results in the advertisements with the best likelihood of generating revenues being utilized for queries that would ordinarily have resulted in pages with no coverage.

In another embodiment of the present invention, keyword combinations that would ordinarily result in pages with no coverage may be bundled using categorization. These bundles may then be sold in packages to advertisers at a discounted price per click. The major selling point for this embodiment would be the fact that users are searching for these terms and no advertiser is bidding on them. These bundles may be compiled using historic search and click-through information to result in a complex bundle of keywords that an advertiser wouldn't ordinarily be able to figure out on its own.

It should be noted that each of these embodiments may be mixed and matched with other embodiments in various combinations.

Figure 2:
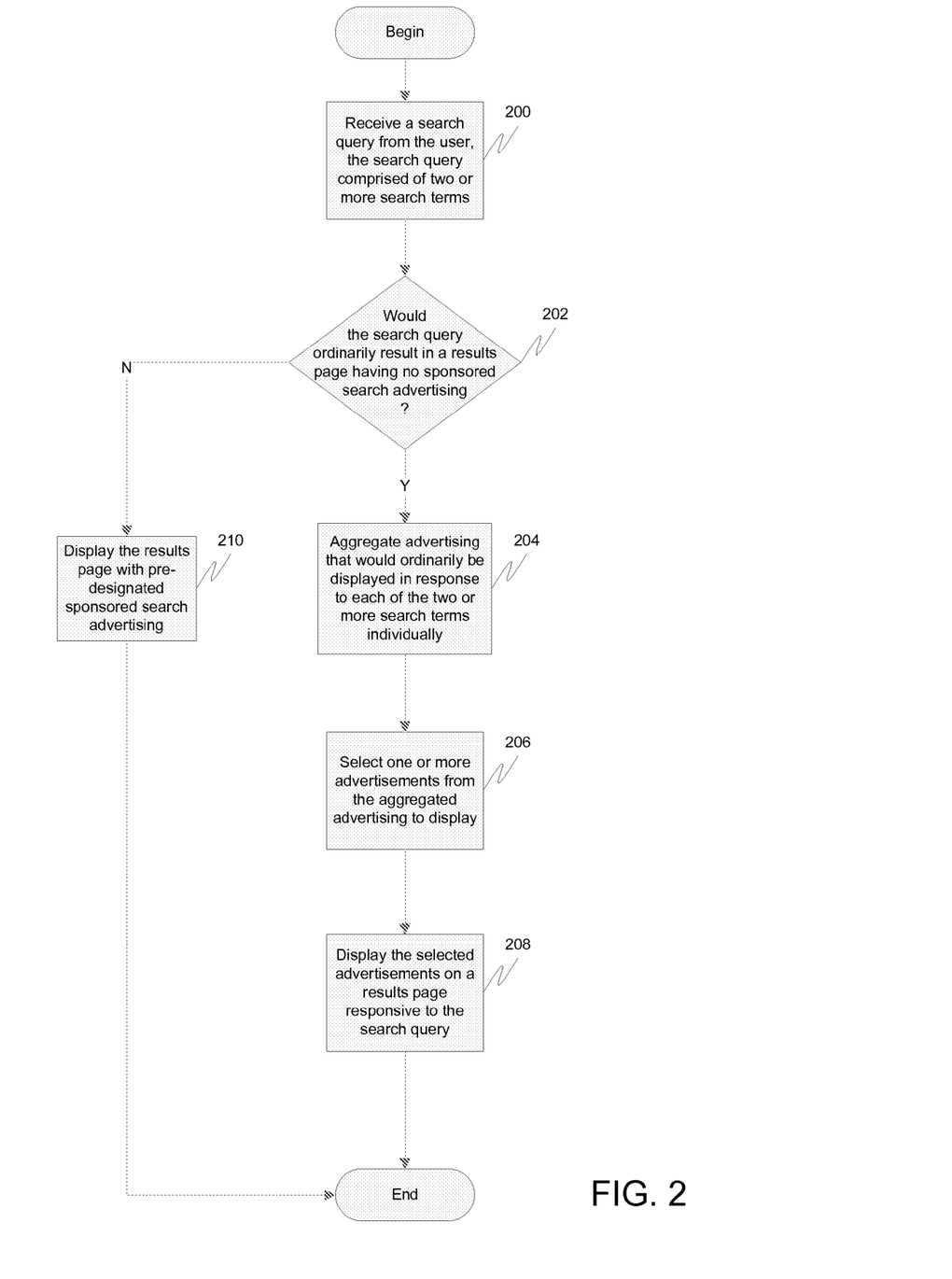
FIG. 2 is a flow diagram illustrating a method for delivering advertising to a user in accordance with an embodiment of the present invention.

FIG. 2 is a flow diagram illustrating a method for delivering advertising to a user in accordance with an embodiment of the present invention. At 200, a search query may be received from the user, wherein the search query is comprised of two or more search terms. At 202, it may be determined if the search query would ordinarily result in a results page having no sponsored search advertising. Sponsored search advertising is advertising that is based on the search query (i.e., whether the advertisement is shown and/or what type of advertising is shown is based on the search query). At 204, if the search query would ordinarily result in a results page having no sponsored search advertising, then advertising that would ordinarily be displayed in response to each of the two or more search terms individually may be aggregated. It should be noted that the term "aggregated" should be read broadly, and should not be limited to actual physical compilation of results. It may, for example, simply involve identifying various combinations of search terms that would ordinarily result in pages having sponsored search advertising. At 206, one or more advertisements may be selected from the aggregated advertising to display. This selection may involve an advanced matching process described above. At 208, the selected advertisements may be displayed on a results page responsive to the search query. If the search query would not ordinarily result in a results page having no sponsored search advertising, then at 210 the results page may be displayed with the pre-designated sponsored search advertising.

Figure 3:
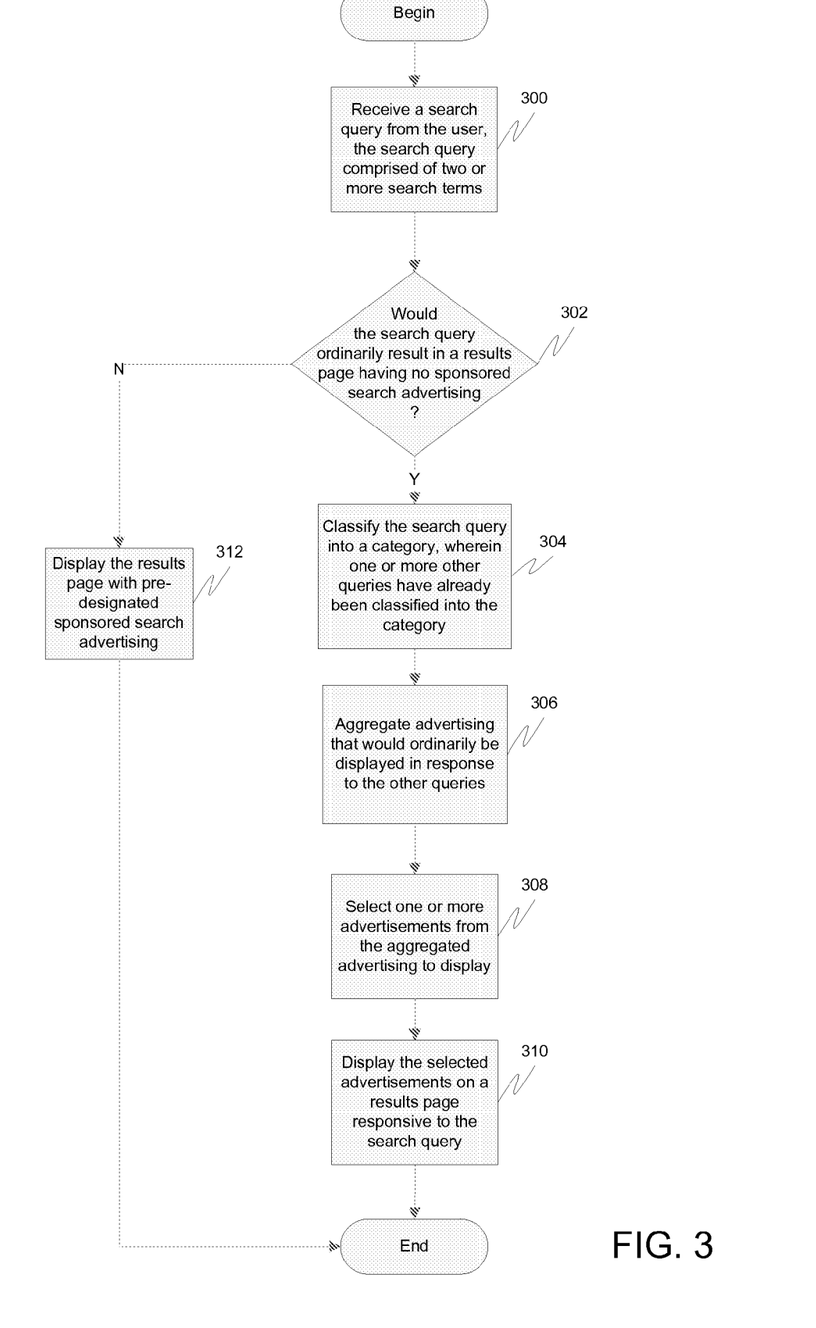
FIG. 3 is a flow diagram illustrating a method for delivering advertising to a user in accordance with another embodiment of the present invention.

FIG. 3 is a flow diagram illustrating a method for delivering advertising to a user in accordance with another embodiment of the present invention. At 300, a search query may be received from the user, wherein the search query is comprised of two or more search terms. At 302, it may be determined if the search query would ordinarily result in a results page having no sponsored search advertising. Sponsored search advertising is advertising that is based on the search query (i.e., whether the advertisement is shown and/or what type of advertising is shown is based on the search query). At 304, if the search query would ordinarily result in a results page having no sponsored search advertising, then the search query may be classified into a category, wherein one or more other queries have already been classified into the category. At 306, advertising that would ordinarily be displayed in response to the other queries classified into the category may be aggregated. Once again it should be noted that the term "aggregated" should be construed broadly. It may be something as simple as identifying other queries in the category. At 308, one or more advertisements may be selected from the aggregated advertising to display. This selection may involve an advanced matching process described above. At 310, the selected advertisements may be displayed on a results page responsive to the search query. If the search query would not ordinarily result in a results page having no sponsored search advertising, then at 312 the results page may be displayed with the pre-designated sponsored search advertising.

Figure 4:
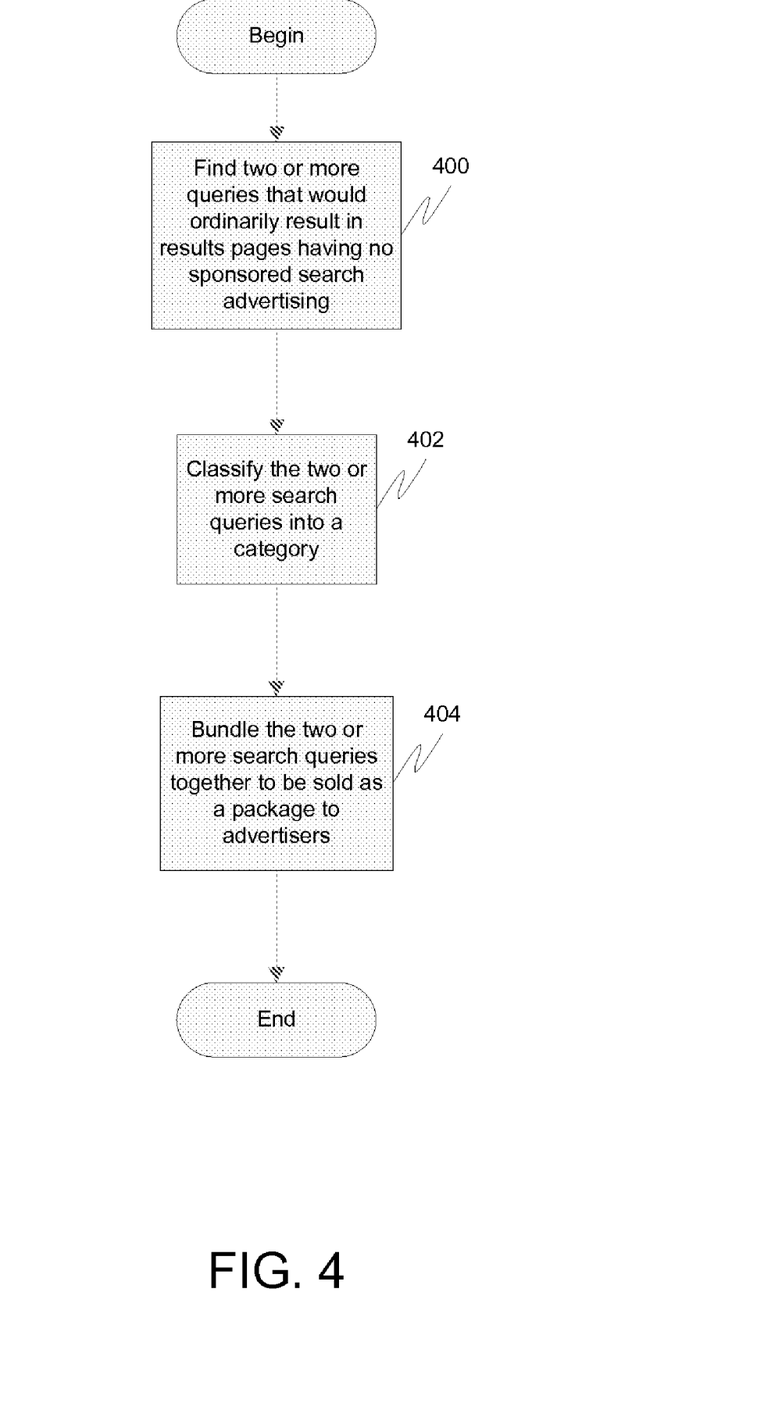
FIG. 4 is a flow diagram illustrating a method for charging advertisers for advertising in accordance with another embodiment of the present invention.

FIG. 4 is a flow diagram illustrating a method for charging advertisers for advertising in accordance with another embodiment of the present invention. At 400, two or more queries that would ordinarily result in results pages having no sponsored search advertising may be found. At 402, the two or more search queries may be classified into a category. At 404, the two or more search queries may be bundled together to be sold as a package to advertisers.

Figure 5:
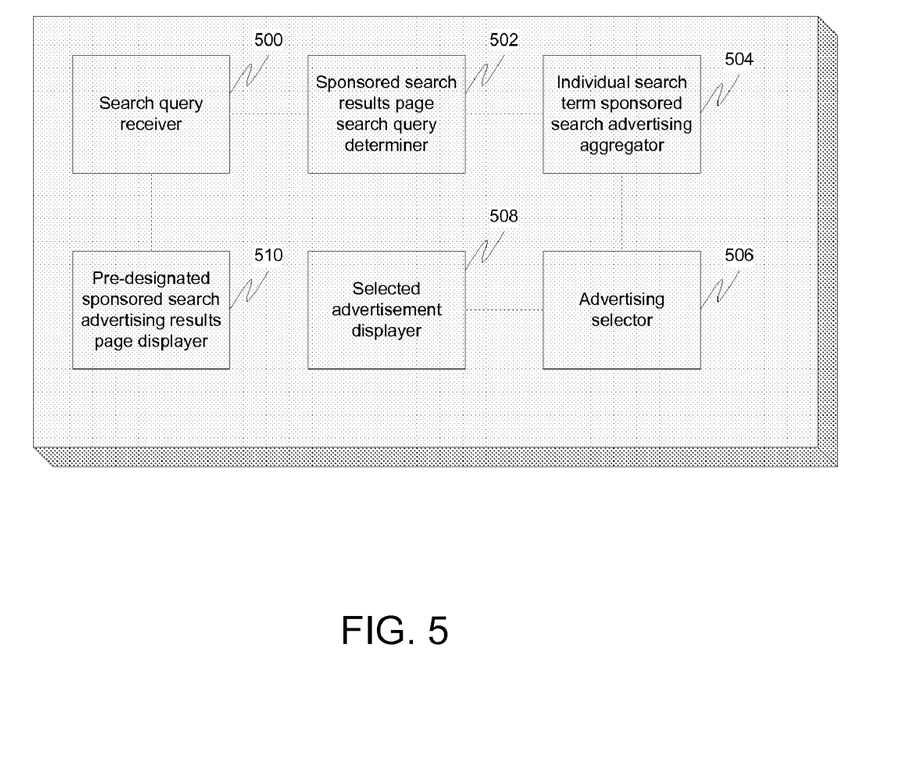
FIG. 5 is a block diagram illustrating an apparatus for delivering advertising to a user in accordance with an embodiment of the present invention.

FIG. 5 is a block diagram illustrating an apparatus for delivering advertising to a user in accordance with an embodiment of the present invention. Each element of this apparatus may be embodied in hardware, software, or any combination thereof. A search query receiver 500 may receive a search query from the user, wherein the search query is comprised of two or more search terms. A sponsored search results page search query determiner 502 coupled to the search query receiver 500 may determine if the search query would ordinarily result in a results page having no sponsored search advertising. If the search query would ordinarily result in a results page having no sponsored search advertising, then an individual search term sponsored search advertising aggregator 504 coupled to the sponsored search results page search query determiner 502 may aggregate advertising that would ordinarily be displayed in response to each of the two or more search terms individually. An advertising selector 506 coupled to the individual search term sponsored search advertising aggregator 504 may select one or more advertisements from the aggregated advertising to display. This selection may involve an advanced matching process described above. A selected advertisement displayer 508 coupled to the advertising selector 506 may display the selected advertisements on a results page responsive to the search query. If the search query would not ordinarily result in a results page having no sponsored search advertising, then a pre-designated sponsored search advertising results page displayer 510 coupled to the sponsored search results page search query determiner 502 may display the results page with the pre-designated sponsored search advertising.

Figure 6:
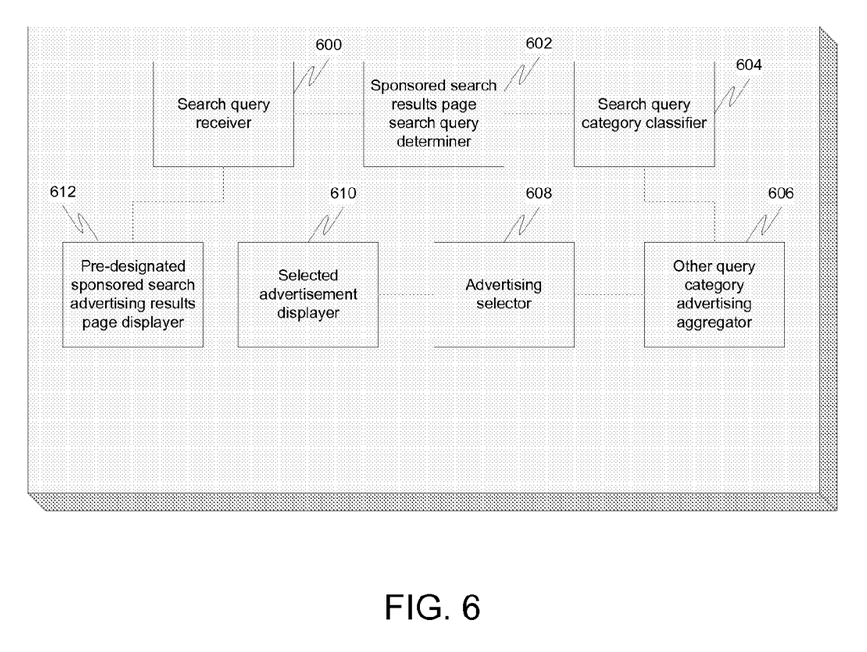
FIG. 6 is a block diagram illustrating an apparatus for delivering advertising to a user in accordance with another embodiment of the present invention.

FIG. 6 is a block diagram illustrating an apparatus for delivering advertising to a user in accordance with another embodiment of the present invention. Each element of this apparatus may be embodied in hardware, software, or any combination thereof. A search query receiver 600 may receive a search query from the user, wherein the search query is comprised of two or more search terms. A sponsored search results page search query determiner 602 coupled to the search query receiver 600 may determine if the search query would ordinarily result in a results page having no sponsored search advertising. If the search query would ordinarily result in a results page having no sponsored search advertising, a search query category classifier 604 coupled to the sponsored search results page search query determiner 602 may classify the search query into a category, wherein one or more other queries have already been classified into the category. An other query category advertising aggregator 606 coupled to the search query category classifier 604 may aggregate advertising that would ordinarily be displayed in response to the other queries classified into the category. An advertising selector 608 coupled to the other query category advertising aggregator 606 may select one or more advertisements from the aggregated advertising to display. This selection may involve an advanced matching process described above. A selected advertisement displayer 610 coupled to the advertising selector 608 may display the selected advertisements on a results page responsive to the search query. If the search query would not ordinarily result in a results page having no sponsored search advertising, then a pre-designated sponsored search advertising results page displayer 612 coupled to the sponsored search results page search query determiner 602 may display the results page with the pre-designated sponsored search advertising.

Figure 7:
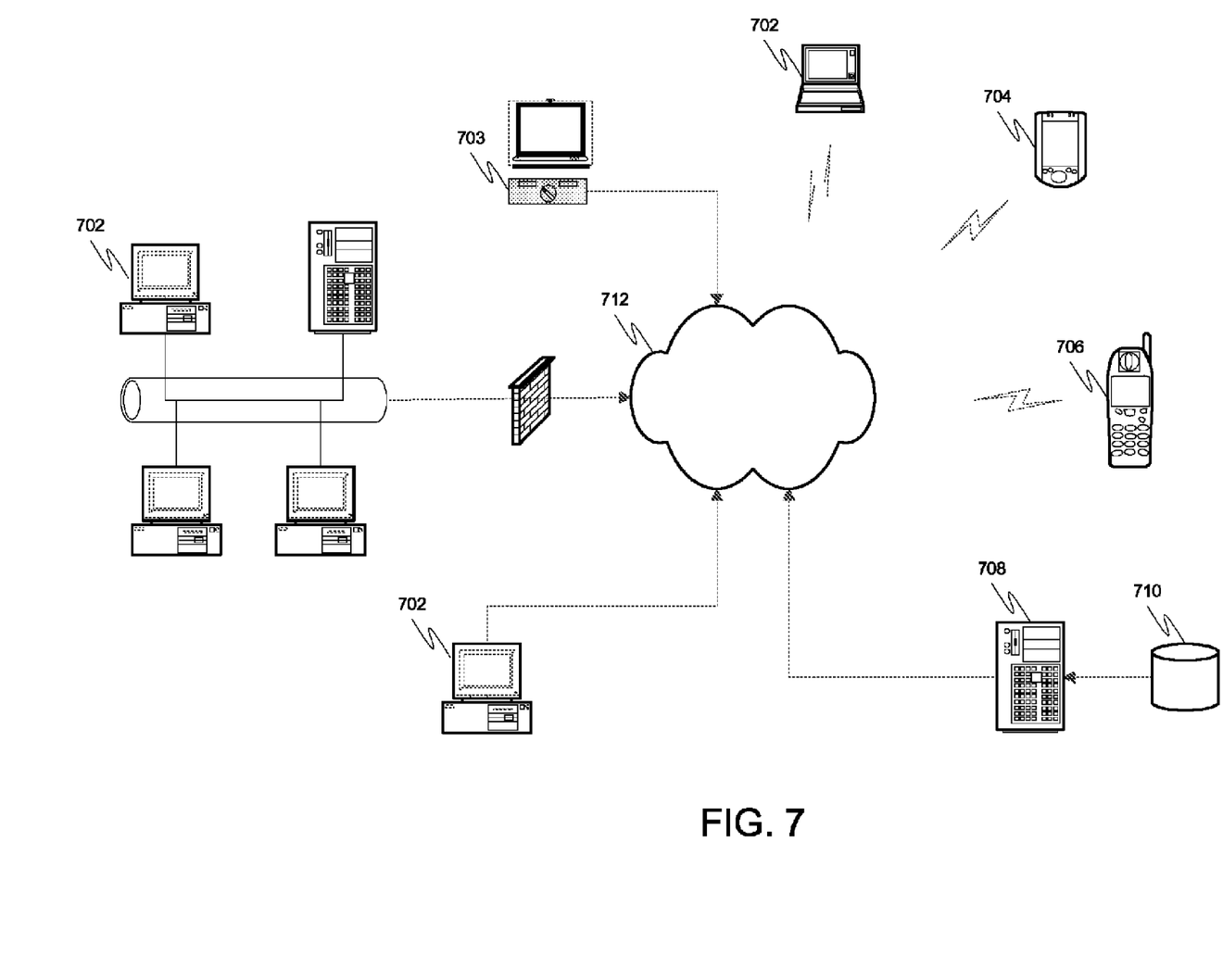
FIG. 7 is an exemplary network diagram illustrating some of the platforms which may be employed with various embodiments of the invention.

It should also be noted that the present invention may be implemented on any computing platform and in any network topology in which search is a useful functionality. For example and as illustrated in FIG. 7, implementations are contemplated in which the user applications are employed on personal computers 702, media computing platforms 703 (e.g., cable and satellite set top boxes with navigation and recording capabilities (e.g., Tivo)), handheld computing devices (e.g., PDAs) 704, cell phones 706, or any other type of portable communication platform. As discussed above, such applications may be resident on such devices, e.g., as part of a browser or other application, or be served up from a remote site, e.g., in a Web page, (represented by server 708 and data store 710). The invention may also be practiced in a wide variety of network environments (represented by network 712), e.g., TCP/IP-based networks, telecommunications networks, wireless networks, etc.

It should be noted that the term "program storage device" used in this application shall refer to tangible computer-readable media such as floppy drives, CD-ROMs, DVD-ROMs, RAM, hard-drives, etc. and shall not be construed to cover intangible media such as network transmission lines, wireless transmission media, signals propagating through space, radio waves, infrared signals, etc.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method, comprising:
   receiving a search query, wherein the search query is comprised of two or more search terms;
   determining if the search query would ordinarily result in a results page having no sponsored search advertising, wherein sponsored search advertising is advertising wherein a sponsor pays to have a particular search term combination return a results page in which the sponsor's link is displayed as a substantive search result;
   if the search query would ordinarily result in a results page having no sponsored search advertising:
      aggregating sponsored search advertising that would ordinarily be displayed in response to each of the two or more search terms individually;
      selecting from the aggregated sponsored search advertising one or more sponsored search advertisements to display;
      providing a financial incentive, to pay for sponsored search advertising for the search query, to one or more sponsored search advertisers of the selected one or more sponsored search advertisements, wherein the financial incentive is one that is not offered when the search query would ordinarily result in a results page having sponsored search advertising; and
      displaying the selected advertisements on a results page responsive to the search query.

2. The computer-implemented method of claim 1, wherein the financial incentive includes:
   charging sponsored search advertisers of the selected sponsored search advertisements a discounted rate for the selected sponsored search advertisements.

3. The computer-implemented method of claim 2, wherein the discounted rate is calculated based on the relevancy of the search query to a search query purchased by the sponsored search advertiser.

4. The computer-implemented method of claim 3, wherein the discounted rate factors in the geographic location of the sponsored search advertiser.

5. The computer-implemented method of claim 3, wherein the discounted rate factors in the popularity of the search terms.

6. The computer-implemented method of claim 1, wherein the sponsored search advertising is pay-per-click advertising.

7. The computer-implemented method of claim 3, wherein the discounted rate factors in the sponsored search advertising rate for one or more of the search terms.

8. The computer-implemented method of claim 3, wherein the discounted rate factors in a weighting applied to each of the search terms.

9. The computer-implemented method of claim 1, wherein the financial incentive includes:
  temporarily charging sponsored search advertisers of the selected sponsored search advertisements nothing for the selected sponsored search advertisements even if users click on the selected sponsored search advertisements.

10. A computer-implemented method, comprising:
  receiving a search query, wherein the search query is comprised of two or more search terms;
  determining if the search query would ordinarily result in a results page having no sponsored search advertising, wherein sponsored search advertising is advertising wherein a sponsor pays to have a particular search term combination return a results page in which the sponsor's link is displayed as a substantive search result;
  if the search query would ordinarily result in a results page having no sponsored search advertising:
    classifying the search query into a category, wherein one or more other queries have already been classified into the category;
    aggregating sponsored search advertising that would ordinarily be displayed in response to the other queries classified into the category;
    selecting from the aggregated sponsored search advertising one or more sponsored search advertisements to display;
    providing a financial incentive, to pay for sponsored search advertising for the search query, to one or more sponsored search advertisers of the selected one or more sponsored search advertisements, wherein the financial incentive is one that is not offered when the search query would ordinarily result in a results page having sponsored search advertising; and
    displaying the selected sponsored search advertisements on a results page responsive to the search query.

11. The computer-implemented method of claim 10, wherein the selecting includes selecting sponsored search advertisements with historically high click through rates.

12. The computer-implemented method of claim 10, further comprising, if the search query would ordinarily result in a results page having no sponsored search advertising:
  charging sponsored search advertisers of the selected sponsored search advertisements a discounted rate for the selected sponsored search advertisements.

13. The computer-implemented method of claim 12, further comprising, if the search query would ordinarily result in a results page having no sponsored search advertising:
  charging sponsored search advertisers of the selected sponsored search advertisements nothing for the selected sponsored search advertisements even if users click on the selected sponsored search advertisements.

14. A computer-implemented method, comprising:
  finding two or more search queries that would ordinarily result in results pages having no sponsored search advertising, wherein sponsored search advertising is advertising wherein a sponsor pays to have a particular search term combination return a results page in which the sponsor's link is displayed as a substantive search result;
  classifying the two or more search queries into a category;
  bundling the two or more search queries together to be sold as a package to sponsored search advertisers; and
  providing a financial incentive, to pay for sponsored search advertising for the category, to sponsored search advertisers, wherein the financial incentive is one that is not offered when the search query would ordinarily result in a results page having sponsored search advertising, wherein the financial incentive is offered if the search query would ordinarily result in a results page having no sponsored search advertising.

15. The computer-implemented method of claim 14, wherein providing a financial incentive includes charging a discounted rate.

16. A computer-implemented method comprising:
  finding two or more search queries that would ordinarily result in results pages having no sponsored search advertising, wherein sponsored search advertising is advertising wherein a sponsor pays to have a particular search term combination return a results page in which the sponsor's link is displayed as a substantive search result;
  classifying the two or more search queries into a category;
  bundling the two or more search queries together to be sold as a package to advertisers;
  receiving a first search query, wherein the first search query is comprised of two or more search terms;
  determining if the first search query would ordinarily result in a results page having no sponsored search advertising;
  if the first search query would ordinarily result in a results page having no sponsored search advertising:
    aggregating sponsored search advertising that would ordinarily be displayed in response to each of the two or more search terms of the first search query individually, into first aggregated sponsored search advertising;
    selecting first selected sponsored search advertisements from the first aggregated sponsored search advertising one or more sponsored search advertisements to display;
    providing a financial incentive, to pay for sponsored search advertising for the first search query, to one or more sponsored search advertisers of the selected first one or more sponsored search advertisements, wherein the financial incentive is one that is not offered when the first search query would ordinarily result in a results page having sponsored search advertising; and
    displaying the first selected sponsored search advertisements on a results page responsive to the first search query;
  receiving a second search query from a user, wherein the second search query is comprised of two or more search terms;
  determining if the second search query would ordinarily result in a results page having no sponsored search advertising;
  if the second search query would ordinarily result in a results page having no sponsored search advertising:
    classifying the second search query into a category, wherein one or more other queries have already been classified into the category;
    aggregating sponsored search advertising that would ordinarily be displayed in response to the other queries classified into the category, into second aggregated sponsored search advertising;
    selecting second selected sponsored search advertisements from the second aggregated sponsored search advertising one or more sponsored search advertisements to display;
    providing a financial incentive, to pay for sponsored search advertising for the second search query, to one or more sponsored search advertisers of the selected second one or more sponsored search advertisements, wherein the financial incentive is one that is not offered when the second search query would ordinarily result in a results page having sponsored search advertising; and displaying the second selected sponsored search advertisements on a results page responsive to the second search query.

17. An apparatus, embodied in hardware, for delivering sponsored search advertising, the apparatus comprising:
a search query receiver;
a sponsored search results page search query determiner coupled to the search query receiver, wherein sponsored search advertising is advertising wherein a sponsor pays to have a particular search term combination return a results page in which the sponsor's link is displayed as a substantive search result;
an individual search term sponsored search advertising aggregator coupled to the sponsored search results page search query determiner;
an advertising selector coupled to the individual search term sponsored search advertising aggregator and configured to provide a financial incentive, to pay for sponsored search advertising for a search query, wherein the financial incentive is one that is not offered when the search query would ordinarily result in a results page having sponsored search advertising, wherein the financial incentive is offered when the search query would ordinarily result in a results page having no sponsored search advertising; and
a selected advertising displayer coupled to the advertising selector.

18. The apparatus of claim 17, wherein the advertising selector is configured to provide a financial incentive by charging a sponsor a discounted rate for providing a results page including the sponsor's link or temporarily charging the sponsor nothing for providing a results page including the sponsor's link.

19. An apparatus, embodied in hardware, for delivering advertising to a user, the apparatus comprising:
a search query receiver;
a sponsored search results page search query determiner coupled to the search query receiver, wherein sponsored search advertising is advertising wherein a sponsor pays to have a particular search term combination return a results page in which the sponsor's link is displayed as a search result;
a search query category classifier coupled to the sponsored search results page search query determiner;
an other query category advertising aggregator coupled to the search query category classifier;
an advertising selector coupled to the other query category advertising aggregator and configured to provide a financial incentive, to pay for sponsored search advertising for a search query, wherein the financial incentive is one that is not offered when a search query would ordinarily result in a results page having sponsored search advertising, wherein the financial incentive is offered if the search query would ordinarily result in a results page having no sponsored search advertising; and
a selected advertisement displayer coupled to the advertising selector.

20. The apparatus of claim 19, wherein the advertising selector is configured to provide a financial incentive by charging a sponsor a discounted rate for providing a results page including the sponsor's link or temporarily charging the sponsor nothing for providing a results page including the sponsor's link.

21. A program storage device readable by a machine, tangibly embodying a program of instructions executable by the machine to perform a method for delivering advertising, the method comprising:
receiving a search query, wherein the search query is comprised of two or more search terms;
determining if the search query would ordinarily result in a results page having no sponsored search advertising, wherein sponsored search advertising is advertising wherein a sponsor pays to have a particular search term combination return a results page in which the sponsor's link is displayed as a search result;
if the search query would ordinarily result in a results page having no sponsored search advertising:
aggregating sponsored search advertising that would ordinarily be displayed in response to each of the two or more search terms individually;
selecting from the aggregated sponsored search advertising one or more sponsored search advertisements to display;
providing a financial incentive, to pay for sponsored search advertising for the search query, to sponsored search advertisers of the selected one or more sponsored search advertisements, wherein the financial incentive is one that is not offered when the search query would ordinarily result in a results page having sponsored search advertising; and
displaying the selected sponsored search advertisements on a results page responsive to the search query.

22. The program storage device of claim 21, wherein providing a financial incentive includes charging the sponsored search advertisers of the selected one or more sponsored search advertisements a discounted rate for the selected one or more sponsored search advertisements or temporarily charging the sponsored search advertisers of the selected one or more sponsored search advertisements nothing for the selected one or more sponsored search advertisements.

23. A program storage device readable by a machine, tangibly embodying a program of instructions executable by the machine to perform a method for delivering sponsored search, the method comprising:
receiving a search query, wherein the search query is comprised of two or more search terms;
determining if the search query would ordinarily result in a results page having no sponsored search advertising, wherein sponsored search advertising is advertising wherein a sponsor pays to have a particular search term combination return a results page in which the sponsor's link is displayed as a search result;
if the search query would ordinarily result in a results page having no sponsored search advertising:
classifying the search query into a category, wherein one or more other queries have already been classified into the category;
aggregating sponsored search advertising that would ordinarily be displayed in response to the other queries classified into the category;
selecting from the aggregated sponsored search advertising one or more sponsored search advertisements to display;
providing a financial incentive, to pay for sponsored search advertising for the search query, to sponsored search advertisers of the selected one or more sponsored search advertisements, wherein the financial incentive is one that is not offered when the search query would ordinarily result in a results page having sponsored search advertising; and displaying the selected sponsored search advertisements on a results page responsive to the search query.

24. The program storage device of claim 23, wherein providing a financial incentive includes charging the sponsored search advertisers of the selected one or more sponsored search advertisements a discounted rate for the selected one or more sponsored search advertisements or temporarily charging the sponsored search advertisers of the selected one or more sponsored search advertisements nothing for the selected one or more sponsored search advertisements.

* * * * *